(12) United States Patent
Schubert et al.

(10) Patent No.: US 8,247,525 B2
(45) Date of Patent: Aug. 21, 2012

(54) PARTICLES AND COMPOSITE PARTICLES, THEIR USES AND A NOVEL PROCESS FOR PRODUCING THEM FROM ALKOXYSILYL-GROUP-CARRYING ALKOXYLATION PRODUCTS

(75) Inventors: Frank Schubert, Neukirchen-Vluyn (DE); Matthias Naumann, Greensboro, NC (US); Wilfried Knott, Essen (DE); Joachim Venzmer, Essen (DE); Berend-Jan de Gans, Mülheim an der Ruhr (DE); Susann Wiechers, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 0 days.

(21) Appl. No.: 13/019,464

(22) Filed: Feb. 2, 2011

(65) Prior Publication Data

US 2011/0281973 A1   Nov. 17, 2011

(51) Int. Cl.
*C08G 77/46* (2006.01)

(52) U.S. Cl. ........................................ 528/403

(58) Field of Classification Search ............... 528/403
See application file for complete search history.

(56) References Cited

U.S. PATENT DOCUMENTS

2010/0112204 A1*   5/2010   Marte et al. ............... 427/222

FOREIGN PATENT DOCUMENTS

| EP | 2194086 | 6/2010 |
| EP | 1074575 | 2/2011 |
| EP | 2289972 | 3/2011 |
| EP | 1097968 | 5/2011 |
| JP | 11255889 | 9/1999 |
| WO | 2008 124960 | * 10/2008 |
| WO | WO 2010/136279 | 12/2010 |
| WO | WO 2010/136281 | 12/2010 |

OTHER PUBLICATIONS

International Search Report for EP 10 19 7246 dated Mar. 18, 2011.

* cited by examiner

*Primary Examiner* — Kuo-Liang Peng
(74) *Attorney, Agent, or Firm* — Frommer Lawrence & Haug LLP

(57) ABSTRACT

The present invention related to particles and composite particles, their uses and a novel process for producing them from alkoxysilyl-group-carrying alkoxylation products.

10 Claims, 2 Drawing Sheets

PARTICLES AND COMPOSITE PARTICLES, THEIR USES AND A NOVEL PROCESS FOR PRODUCING THEM FROM ALKOXYSILYL-GROUP-CARRYING ALKOXYLATION PRODUCTS

Any foregoing applications, including German patent application DE 10 2010 001528.8, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to novel particles and composite particles, to their uses and to processes for producing them from alkoxysilyl-group-carrying alkoxylation products.

Within the context of this invention, particles or composite particles are understood as meaning solid, in most cases finely divided, substances and compositions dispersed in air or liquids. Finely divided here means that the particles are less than or equal to 1 cm in all three dimensions and are preferably 100 nm to 2 mm in size. Important distinguishing features of particles are: size, shape, mass, density, if appropriate pore volume and pore size and distributions thereof, and also electric and magnetic properties. The particles described here may be compact-filled or permeated with cavities which may, if appropriate, be partially or completely filled with further components such as, for example, gases, air, liquids, further solids or polymers. The filling may also consist of mixtures of said components. In the case of charged or filled particles, all morphologies are possible, from sponge (matrix) ranging to core/shell particles.

Particles and composite particles based on crosslinkable polyethers are virtually unknown in the literature. Only JP 11-255889 describes the production of spherical particles from linear polypropylene oxide terminated with methyldimethoxysilyl groups.

By contrast, pulverulent silicone compounds are already used widely as additives in cosmetics and toiletries, e.g. as matting agents, as absorbers for skin sebums or for producing a silky skin feel, as additives for improving the mechanical properties of polymers and paints or coatings, e.g. for increasing the abrasion resistance or scratch resistance and also the impact resistance, and also as antiblocking agents for improving the lubricant properties of a wide variety of different surfaces, as flow or dispersion auxiliaries in powders, as additives in toners, and as a mild abrasive in washing and care formulations.

Several methods are known for producing such particles. In principle, non-spheroidally shaped silicone elastomer particles can be obtained by grinding processes of the particular bulk elastomers, although spheroidal or spherical particles generally offer performance advantages, especially if pleasing (silky, soft, supple) haptic properties of the materials and formulations to which particles have been added is desired. Usually, such particles are produced by crosslinking reactions within reactant droplets or growth/application of a polymer onto a particle core. In this connection, crosslinking reactions may be hydrosilylation reactions, condensation reactions, dehydrogenative coupling reactions or else free-radical polymerizations.

Silicone particles from hydrosilylations are described, for example, in U.S. Pat. No. 4,761,454, JP 2003301047 and EP 1 074 575 (U.S. Pat. No. 6,531,542), hydrolysis and condensation reactions for producing silicone particles can be found in EP 1 130 046, WO 2006/016968 (US Publ. 2008027172), JP 2003002973, U.S. Pat. No. 6,753,399, EP 0 765 896 (U.S. Pat. No. 5,789,517) and EP 0 744 432 (U.S. Pat. No. 5,854,369), while US 2004/0156808 describes a dehydrogenative coupling reaction for this purpose. Finally, DE 10 2004 053 314 (US Publ. 2009-104238 describes copolymers obtainable by means of free-radical polymerizations. In each of the specifications mentioned here, the starting point for producing the particles is the emulsification of the corresponding monomers.

The miniemulsion polymerization of silicone acrylates is known in the literature ("Polydimethyl siloxane latexes and copolymers by polymerization and polyaddition in miniemulsion", Katharina Landfester, Ute Pawelzik, Markus Antonietti, Polymer, 46 (2005), 9892-9898).

DE 10 2009 022630.3, which as yet has not been laid open, describes stable, aqueous emulsions of the alkoxysilyl-group-carrying alkoxylation products, in particular those compounds of the formula (1).

Aqueous emulsions are generally stabilized with the help of molecular emulsifiers. These molecules build up at the oil/water interface and thereby prevent coalescence of the drops and/or Ostwald ripening, as a result of which the emulsion would ultimately separate into a macroscopic oil phase and water phase. Alternatively, emulsions can be stabilized by the adsorption of solids. Solids-stabilized, aqueous emulsions were described in 1907 by S. U. Pickering ("Emulsions", Spencer Umfreville Pickering, Journal of the Chemical Society, Transactions (1907), 91, 2001-2021) and are deemed to be particularly stable against coalescence. Thus, DE 10 2004 014 704 (US Publ. 2007-281878), for example, describes the preparation of emulsions which are stabilized with pyrogenic particles. A good overview of the properties of such stabilizing solids particles can be found in "Particles as surfactants—similarities and differences" by Bernhard P. Binks (Current opinion in colloid & interface science, 7 (2002), 21-41). The prior art also includes so-called "Janus particles", amphiphilic particles with a hemispherically modified surface, as described e.g. in FR 2 808 704 (US Publ. 2004-029978). Of particularly good suitability for emulsion stabilization are nanoscale, predominantly inorganic particles, e.g. silica particles, which are commercially available as "LUDOX®" in the form of aqueous sols and dispersions from Grace Davison.

U.S. Pat. No. 3,615,972 (1967) describes for the first time the use of LUDOX® particles for emulsion stabilization of methyl methacrylate with subsequent polymerization.

DE 10 2007 058 713 (US Publ. 2009-149573) describes the production of silicone (meth)acrylate particles in emulsions stabilized with LUDOX® particles. The mechanism for the stabilizing effect discussed in the literature is the agglomeration of the particles and the enrichment of the agglomerates at the water/oil interface ("The mechanism of emulsion stabilization by small silica (LUDOX®) particles", Helen Hassander, Beatrice Johansson, Bertil Töornell, Colloids and Surfaces, 40, (1989), 93-105).

A disadvantage of the particles produced according to the prior art is that polydimethylsiloxane-like particle surfaces can only be modified with difficulty. However, this is often desired in order to be able to adapt the particles to the different technical requirements, i.e. for example, to enable their attachment to various matrices or to facilitate or actually make possible incorporability into formulations.

Some of these disadvantages can be overcome by composite particles. Composite particles is the term used here to refer both to core/shell particles and also particles with a sponge-like structure, including all structural types between these definition limits, and also particles into which additional solids have been incorporated.

For example, U.S. Pat. No. 4,946,893 (EP 0 319 828) describes the preparation of silicone particles filled with inorganic particles by means of a hydrosilylation reaction in aqueous phase, and U.S. Pat. No. 5,176,960 describes the preparation of highly filled, mechanically durable silicone particles by means of mixing a hydrophobicized $SiO_2$ with a diorganopolysiloxane and subsequent curing by spray-drying. In contrast, core/shell particles may allow targeted modifications of surface properties, which influence the desired performance properties.

Depending on the preparation process and use of the core/shell particles, their particle size may be within the nanometer or micrometer range. Core/shell particles can be produced, for example, by processes known in the literature; for example EP 0 661 334 (U.S. Pat. No. 5,538,793) describes silicone particles surface-coated with an organopolysilsesquioxane resin and their production, US 2006/0084758 describes the production of silicone particles surface-modified with smaller silicone particles, and silicone particles coated subsequently with $SiO_2$ from the aqueous phase can be found in EP 0 516 057 (U.S. Pat. No. 5,948,469). Furthermore, EP 0 079 322 describes silicone particles surface-coated with $SiO_2$ with the aid of an oily phase. Core/shell particles with a silicone polymer core and organopolymer shell are described in DE 10 2004 047 708 (US Publ. 2009-197989) and DE 10 2004 022 406 (US Publ. 2007-213474) (use in aqueous coatings EP 0 882 105 (U.S. Pat. No. 6,147,142), and in powder coatings in EP 0 852 610 (U.S. Pat. No. 5,981,659)).

Furthermore, there are numerous documents which relate to core/shell structures with an inorganic core and silicone shell, e.g. EP 0 822 232 (U.S. Pat. No. 6,071,987) and EP 0 433 727 (U.S. Pat. No. 5,188,899).

In contrast to the cited prior art, the present invention describes the preparation of particles based on or even exclusively consisting of alkoxysilyl-group-carrying alkoxylation products, in particular in the range greater than 1 μm and less than 2 mm.

Citation or identification of any document in this application is not an admission that such document is available as prior art to the present invention.

The object of the present invention is to provide particles and composite particles based on alkoxysilyl-group-carrying alkoxylation products, and a suitable production process therefor.

This object is achieved by condensation for producing particles and/or composite particles of alkoxysilyl-group-carrying alkoxylation products with a molar mass greater than or equal to 300 g/mol, in particular compounds of the formula (1). The compounds of the formula (1) can also be referred to as silyl polyethers. Preferably, the alkoxysilyl-group-carrying alkoxylation products also have at least one hydroxyl group.

The production takes place by condensation of an emulsified organic phase, comprising at least one alkoxysilyl-group-carrying alkoxylation product, in an aqueous, optionally solids-stabilized phase and preferably by means of a catalyst added via the aqueous phase.

Alkoxysilyl-group-carrying alkoxylation products, in particular those compounds of the formula (1) (silyl polyethers), which are used within the context of this invention are understood as meaning all reaction products which can be prepared by alkoxylation of epoxy-functional silanes over double metal cyanide catalysts according to the process described in the as yet not prior-published document DE 10 2009 022630.3; in particular, these compounds can also carry siloxane groups. These products are referred to below as compounds of the formula (1). The content of the description and of the claims of DE 10 2009 022630.3 is to be regarded as hereby forming part of this disclosure in its entirety.

Within the context of this invention, a silyl group is characterized in that, besides having at least one alkoxy function, it has one or two alkyl functions or one or two further alkoxy functions on a silicon atom, it being possible for the organic or oxyorganic groups present in the radicals to be identical or different.

Formula (1)

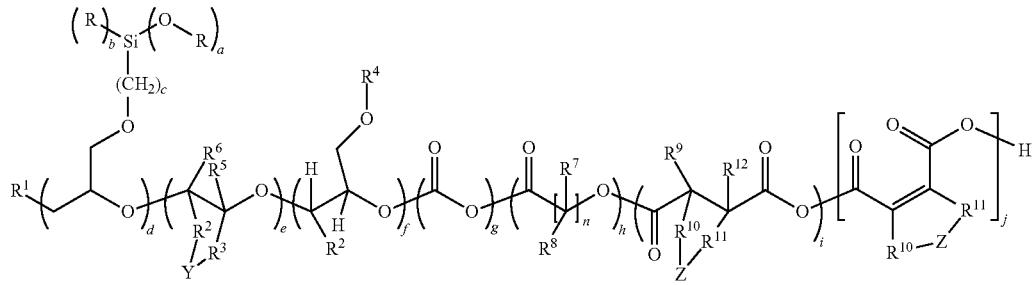

Silyl polyether 1 - see also FIG. 1 where a is an integer from 1 to 3, preferably 3, b is an integer from 0 to 2, preferably 0 to 1, particularly preferably 0, and the sum of a and b is 3, c is an integer from 0 to 22, preferably from 0 to 12, particularly preferably from 0 to 8, very particularly preferably from 0 to 4 and in particular 1 or 3, d is an integer from 1 to 500, preferably 1 to 100, particularly preferably greater than 1, very particularly preferably 2 to 20 and especially preferably 2 to 10, e is an integer from 0 to 10 000, preferably 1 to 2000, particularly preferably 2 to 2000 and especially 2 to 500, f is an integer from 0 to 1000, preferably 0 to 100, particularly preferably 0 to 50 and in particular 0 to 30, g is an integer from 0 to 1000, preferably 0 to 200, particularly preferably 0 to 100 and in particular 0 to 70, h, i and j, independently of one another, are integers from 0 to 500, preferably 0 to 300, particularly preferably 0 to 200 and in particular 0 to 100, n is an integer between 2 and 8 and with the proviso that the fragments with the indices d to j are freely permutatable among one another, i.e. can be exchanged for one another in the sequence within the polyether chain, and R is one or more identical or different radicals selected from linear or branched, saturated, mono- or polyunsaturated alkyl radicals having 1 to 20, in particular 1 to 6, carbon atoms or haloalkyl groups having 1 to 20 carbon atoms. Preferably, R corresponds to methyl, ethyl, propyl, isopropyl, n-butyl and sec-butyl groups; and $R^1$ is a hydroxyl group or a saturated or unsaturated linear, branched or cyclic or further substituted oxyorganic radical having 1 to 1500 carbon atoms, where the chain may also be interrupted by heteroatoms such as O, S, Si and/or N, or a radical containing an oxyaromatic system, or $R^1$ is an unsaturated ether-functional group, preferably an alkoxy, arylalkoxy or alkylarylalkoxy group and in particular a polyether radical in which the carbon chain may be interrupted by oxygen atoms, or a mono- or polyfused oxyaromatic group or an optionally linear or branched silicone-containing organic radical, $R^2$ and $R^3$, and also $R^5$ and $R^6$, are identical or else, independently of one another, are H or a saturated or optionally mono- or polyunsaturated, also further substituted, optionally mono- or polyvalent hydrocarbon radical, where for the radicals $R^5$ and $R^6$ it is the case that they are a monovalent hydrocarbon radical. The hydrocarbon radical may be bridged cycloaliphatically via the fragment Y; Y may not be present, or else may be a methylene bridge having one or two methylene units, if Y is not present, then $R^2$ and $R^3$, independently of one another, are a linear or branched radical having 1 to 20, preferably 1 to 10, carbon atoms, particularly preferably a methyl, ethyl, propyl or butyl, vinyl, allyl radical or phenyl radical. Preferably, at least one of the two radicals $R^2$ and $R^3$ is hydrogen.

$R^2$—$R^3$ may be a —$CH_2CH_2CH_2CH_2$ group, Y may thus be a —($CH_2CH_2$—) group. The hydrocarbon radicals $R^2$ and $R^3$ may for their part be further substituted and carry functional groups such as halogens, hydroxyl groups or glycidyloxypropyl groups, $R^4$ is a linear or branched alkyl radical of 1 to 24 carbon atoms, or an aromatic or cycloaliphatic radical which may optionally for its part carry alkyl groups;

$R^7$ and $R^8$, independently of one another, are either hydrogen, or alkyl, alkoxy, aryl or aralkyl groups, $R^9$, $R^{10}$, $R^{11}$ and $R^{12}$, independently of one another, are either hydrogen, or alkyl, alkenyl, alkoxy, aryl or aralkyl groups, where the hydrocarbon radical may be bridged cycloaliphatically or aromatically via the fragment Z, where Z may be either a divalent alkylene radical or else alkenylene radical.

In the absence of a nomenclature which describes their composition specifically, the compounds of the formula (1) are referred to hereinbelow as compounds of the formula (1) or as silyl polyethers 1, even if the structure may not encompass the features of a polymeric ether in the conventional sense. For the person skilled in the art, however, the structural similarity of polyether structural elements with those of the compounds of the formula (1)=silyl polyethers 1 is clearly and distinctly apparent.

Within the context of this invention, the term "polyethers" encompasses compounds of the structure of polyethers, polyetherols, polyether alcohols, polyether esters, but also polyether carbonates, which, where appropriate, are used synonymously with one another. Here, it is not necessary for the expression "poly" to necessarily imply that there is a plurality of ether functionalities or alcohol functionalities in the molecule or polymer. Instead, this expression merely indicates that there are at least repeat units of individual monomer building blocks or else compositions which have a higher molar mass and, moreover, also a certain polydispersity.

In connection with this invention, the word fragment "poly" encompasses not only exclusively compounds having at least three repeat units of one or more monomers in the molecule, but in particular also those compositions of compounds which have a molar mass distribution and in this connection have an average molar mass of at least 300 g/mol. This definition takes into account the circumstance that, in the technical field under consideration, it is customary to refer to even compounds of this type as polymers, even when they do not appear to satisfy the definition of a polymer in accordance with OECD or REACH guidelines.

The person skilled in the art is aware that, as a consequence of the production process and the polymeric character of the compounds of the formula (1), products with molar mass distributions and corresponding polydispersities are regularly formed. The numerical values of the indices stated in the definition of the formula (1) should therefore be understood as meaning number-averages of the total possible distributions of the different individual molecules in a molar mass distribution.

$R^1$ is a fragment which comes from the starter or the starter compounds for the alkoxylation reaction according to formula (2)

$$R^1—H \qquad (2)$$

(the H belongs to the OH group of an alcohol or phenolic compound), where starters of the formula (2) can be used alone or in mixtures with one another and have at least one reactive hydroxyl group; the starter may thus also be water.

OH-functional starter compounds $R^1$—H (2) used are preferably compounds with molar masses of 18 (water) to 10 000 g/mol, in particular 50 to 2000 g/mol, and having 1 to 8, preferably having 1 to 4, hydroxyl groups.

Preferably, the starters of the formula (2) used are those in which $R^1$ is a hydroxyl group or a saturated or unsaturated linear, branched or cyclic or further substituted oxyorganic radical having 1 to 1500 carbon atoms, which may optionally also be interrupted by heteroatoms such as O, S, Si or N, or a radical containing an oxyaromatic system; preferably, $R^1$ is an alkoxy, arylalkoxy or alkylarylalkoxy group and in particular a polyether radical, in which the carbon chain can be interrupted by oxygen atoms, or a mono- or polyfused oxyaromatic group or an optionally branched, silicone-containing organic radical.

Furthermore, $R^1$—H may be an oxyalkyl-functional siloxane or an oxy-functional polyethersiloxane.

The chain length of the polyether radicals having alkoxy, arylalkoxy or alkylarylalkoxy groups that can be used as a starter compound is arbitrary. Preferably, the polyether, alkoxy, arylalkoxy or alkylarylalkoxy group contains 1 to 1500 carbon atoms, particularly preferably 2 to 300 carbon atoms, in particular 2 to 100 carbon atoms.

The compounds of the formula (2) are preferably selected from the group of alcohols, polyetherols or phenols. The starter compound used is preferably a mono- or polyhydric polyether alcohol or alcohol $R^1$—H (the H belongs to the OH group of the alcohol or phenol) or else water.

As starter compounds (2) it is advantageous to use low molecular weight polyetherols having 1 to 8 hydroxyl groups and molar masses of from 50 to 2000 g/mol, which have for their part been prepared beforehand by DMC-catalyzed alkoxylation.

Examples of compounds of the formula (2) are water, allyl alcohol, butanol, octanol, dodecanol, stearyl alcohol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylol-propane, glycerol, pentaerythritol, sorbitol, cellulose sugars, lignin or else further compounds carrying hydroxyl groups that are based on natural substances.

Besides compounds with aliphatic and cycloaliphatic OH groups, any desired compounds having 1 to 20 phenolic OH functions are suitable. These include, for example, phenol, alkyl- and arylphenols, bisphenol A and novolacs.

The compounds prepared in this way ensure the synthesis freedom to choose between polyoxyalkylene compounds having alkoxysilyl groups which contain the alkoxysilyl functions either terminally, or in isolation, in blockwise cumulation, or else scattered randomly into the polyoxyalkylene chain.

The compounds of the formula (1) are characterized in that, in terms of structure and molar mass, they can be prepared in a targeted and reproducible manner. The sequence of the monomer units can be varied within wide limits. Epoxide monomers can be incorporated into the polymer chain as desired, in blockwise sequence or randomly. The fragments introduced into the polymer chain that forms as a result of the reaction with ring-opening of the reaction components are freely permutatable among one another in terms of their sequence, with the limitation that cyclic anhydrides and also carbon dioxide are present in random insertion, i.e. not in homologous blocks, in the polyether structure.

Compounds of the formula (1) consist of alkoxysilyl-group-substituted chains which, as a result of the choice of fragments d to j, corresponding to the fragments inserted into the polymer chain as a result of the reaction with ring-opening of the reaction components, are highly functionalized in a targeted manner and can therefore be tailored to different types of fields of application.

The index numbers given in the formulae listed here, and the value ranges of the stated indices are therefore to be understood as meaning the average values of the possible statistical distribution of the structures and/or mixtures thereof that are actually present. This is also true for structural formulae reproduced as such per se in exact form, such as, for example, for formula (1).

Depending on the epoxide-functional alkoxysilane used and any further monomers used, and also, if appropriate, carbon dioxide, it is possible for ester- or carbonate-modified silyl polyethers to be obtained. Preferably, the alkoxysilyl unit in the compound of the formula (1) is a trialkoxysilyl unit.

As $^{29}$Si—NMR and GPC investigations reveal, the process-related presence of OH groups in chain-end positions provides the possibility for transesterification reactions on the silicon atom both during the DMC-catalyzed preparation and also e.g. in a subsequent process step. In this connection, formally, the alkyl radical R bonded to the silicon via an oxygen atom is replaced by a long-chain modified alkoxysilyl polymer radical. Bimodal and multimodal GPC curves demonstrate that the alkoxylation products include not only the non-transesterified species, as shown in formula (1), but those having twice, sometimes three times or even four times, the molar mass. Formula (1), accordingly, shows only a simplified version of the complex chemical reality.

The compounds of the formula (1) are thus compositions which also comprise compounds in which the sum of the indices (a) plus (b) in formula (1) is, on statistical average, less than 3, since some of the OR groups may be replaced by silyl polyether groups. The compositions thus comprise species which are formed on the silicon atom, with elimination of R—OH and condensation reaction with the reactive OH group of a further molecule of the formula (1). This reaction can take place several times, until, for example, all of the RO groups on the silicon have been replaced by further molecules of the formula (1). The presence of more than one signal in typical $^{29}$Si—NMR spectra of these compounds underlines the occurrence of silyl groups with a different substitution pattern.

The stated values and preferred ranges for the indices (a) to (j) are therefore also to be understood only as average values over the different, individually undeterminable species. The diversity of chemical structures and molar masses is also reflected in the broad molar mass distributions that are typical of silyl polyethers 1 and are entirely unusual for conventional DMC-based polyethers, of $M_w/M_n$ of in most cases $\geq 1.5$.

In the case of the prior art methods, only silyl-group-terminated prepolymers can be formed. The compounds of the formula (1) used according to the invention as reactive component differ from oligomers or polymers modified by conventional methods in that, as a result of the targeted chain construction and the variable insertion of functional groups in a blocklike and also isolated manner, structures are formed which have both a silyl functionalization scattered or distributed in blocks over the entire chain and, moreover, additionally, but not necessarily, can also carry a silyl functionalization at the termini. There is therefore an increased crosslinking density compared with the prior art.

Inseparably connected with the process for alkoxylating epoxy-functional alkoxysilanes that is explained in the as yet unpublished specification DE 10 2009 022630.3 is the special feature that at the termini there is always an OH functionality present, originating from the epoxide ring opening of the last epoxide monomer in each case, with attachment to the OH-functional end of the growing chain.

The compounds of the formula (1) can thus have more than one alkoxysilyl group per hydroxyl group.

The invention therefore provides a process for producing particles or composite particles in which an aqueous emulsion of a silyl polyether (1) is subjected to a condensation reaction.

Surprisingly, it has been found that it is possible to fully cure the drops of silyl polyether of the formula (1) present in an aqueous emulsion via a condensation reaction, if appropriate by means of adding a catalyst via the water phase.

This is encouraged by the fact that even the more highly alkoxysilyl-functionalized compounds of the formula (1) preferably used are readily emulsifiable liquids which, after the crosslinking, can be converted to solid, tack-free particles. In this connection, more highly alkoxysilyl-functionalized means that those compounds according to formula (1) have more than one alkoxysilyl group per hydroxyl group, in which thus the index d assumes values of >1, particularly preferably $\geq 2$. This is accompanied by the fact that the compounds of the formula (1) have on average more than one alkoxysilyl group per chain end of the chain formed from the groups with the indices d to j.

On account of their low crosslinking density, conventional, so-called silyl-terminated polymers, which carry only at most in each case one silyl group at the chain ends, are not very suitable within the context of the preparation according to the invention of particles and composite particles. Such alkoxysilyl-group-carrying prepolymers have the alkoxysilyl groups suitable for crosslinking only at the end of a long polymer chain in each case and are described e.g. in WO 2005/100482 and EP-A1-1 967 550 (US Publ. 2009-088523), EP-A1-1 824 904 (US Publ. 2009-264612), U.S. Pat. No. 7,365,145, U.S. Pat. No. 3,627,722 or U.S. Pat. No. 3,632,557 and U.S. Pat. No. 3,971,751.

The invention therefore provides a process for producing silyl polyether particles and composite particles which is characterized in that an aqueous emulsion comprising at least one alkoxysilyl-group-carrying alkoxylation product, which preferably has at least one hydroxyl group, but in particular compounds of the formula (1), and also emulsifiers stabilizing the emulsion and one or more coemulsifiers, preferably using a catalyst added to the aqueous phase, are cured.

The process for producing the silyl polyether particles comprises the steps
a) producing an emulsion of water and an organic phase, where the organic phase comprises at least one alkoxysilyl-group-carrying alkoxylation product and optionally further additives, which product preferably has at least one hydroxyl group, but in particular compounds of the general formula (1), where optionally the pH of the aqueous phase is adjusted to a value between 5 and 9, preferably between 6 and 8.5 and particularly preferably between 7 and 8,
b) condensing the silyl groups and curing the inner phase, preferably in the presence of a catalyst, which is added to the outer (aqueous) phase in a concentration of from 0.001 to 20.0% by weight, preferably 0.1 to 10.0% by weight and particularly preferably 1.0 to 5.0% by weight, based on the inner phase,
c) separating off the water.

The weight fraction of the organic phase compared with the water phase is 1 to 99% by weight, preferably 5 to 70% by weight and particularly preferably 10 to 50% by weight.

The weight fraction of the alkoxysilyl-group-carrying alkoxylation products, but in particular of the compounds of the formula (1), in the organic phase is 1 to 100% by weight, preferably 10 to 99% by weight and particularly preferably 50 to 98% by weight. The remaining fraction to 100% by weight of the organic phase consists of further additives and/or solvents.

The catalyst is added to the outer (aqueous) phase in a concentration of from 0.001 to 20.0% by weight, preferably 0.1 to 10.0% by weight and particularly preferably 1.0 to 5.0% by weight, based on the inner phase.

The present invention likewise provides particles and composite particles produced in this way and comprising at least one alkoxysilyl-group-carrying alkoxylation product, which preferably has at least one hydroxyl group, but in particular compounds of the formula (1).

The process according to the invention has the advantage that pourable particles of the alkoxysilyl-group-carrying alkoxylation products, which preferably have at least one hydroxyl group, but in particular the compounds of the formula (1) can be produced which can be used without further comminution steps.

The invention further provides the use of the particles or composite particles according to the invention for example as additive for adhesives, coatings, reaction resin systems, pouring compounds, plastics and sealants, e.g. for increasing the impact resistance. The particles or composite particles according to the invention can also be used as additive for cosmetic products, for example for producing a pleasant, soft skin feel. The particles or composite particles according to the invention can also be used as additive for reducing cracking in soap bodies and other solid cleaning bodies. The particles or composite particles according to the invention can also be used as additives for improving the mechanical properties of vulcanisates and/or rubber mouldings. The particles or composite particles according to the invention can also be used as coating material for textiles for reducing frictional resistance. The particles or composite particles according to the invention can also be used as capsule material or carrier material for the encapsulation of, for example, solid or liquid cosmetic or medical or pharmaceutical active ingredients, catalysts or pesticides. The particles or composite particles according to the invention can also be used as material for the encapsulation of additives, such as, for example, vitamins, fragrances or flavourings. The particles or composite particles according to the invention can also be used as material for producing capsule toners for, for example, electrophotographic and/or laser printing processes.

The particles or composite particles produced according to the invention can be easily characterized with regard to: colour, particle size, pore volume, particle size distribution, pore volume distribution, hardness, elasticity, bulk volume, antistatic properties, surface charge, etc. The methods that can be used for this purpose are well known to the person skilled in the art.

The process according to the invention for producing silyl polyether particles according to the invention is described below by way of example, without any intention to limit the invention to these exemplary embodiments.

The preparation of aqueous emulsions from compounds of the formula (1) can take place in accordance with the processes disclosed in the as yet unpublished specification DE 10 2009 022630.3. The content of the description and of the claims of DE 10 2009 022630.3 is hereby considered to form part of this disclosure in its entirety.

It may be advantageous for the aqueous phase to comprise dissolved salts, such as e.g. metal salts, sodium chloride, sodium sulphate or ammonium sulphate.

Emulsifiers which can be used are all customary emulsifiers. These may be anionic, cationic, amphoteric or nonionic surface-active substances. A comprehensive list can be found in DE 10 2009 022630.3.

Typical emulsifiers are e.g. alkyl sulphates, preferably with a chain length of from 10 to 24 carbon atoms, alkyl ether sulphates, preferably having 10 to 24 carbon atoms in the hydrophobic radical and having preferably up to 40 ethylene oxide or propylene oxide units, alkyl- and alkylarylsulfonates having preferably 10 to 24 carbon atoms, esters and half-esters of sulfosuccinic acid with monohydric alcohols, alkyl and alkenyl carboxylates with preferably a chain length from 10 to 24 carbon atoms, alkyl polyglycol ethers and alkylaryl polyglycol ethers having preferably 8 to 24 carbon atoms and in each case 2 to 40 ethylene oxide units, alkyl and alkenyl alcohols having preferably 8 to 24 carbon atoms, ethoxylated vegetable oils, such as e.g. castor oil ethoxylates, sorbitan esters and ethoxylated sorbitan esters, polyethylene oxide-polypropylene oxide-polyethylene oxide triblock copolymers and ethoxylated fatty amines.

It may be advantageous if, in step a), a solids-stabilized emulsions is produced. For this, the emulsifiers used may be solid or liquid, in particular particulate, preferably nanoscale in at least one dimension, particles or nanostructured particles or nanoobjects, which are particularly preferably selected from the group of metal oxides, mixed oxides, nitrides, hydroxides, carbonates, silicates, silicone resins, silicones and/or organic polymers, which are preferably at least (partially) hydrophobicized, e.g. with at least one compound from the group of silanes, siloxanes, quaternary ammonium compounds, cationic polymers and fatty acids or anions thereof.

Within the context of the present invention, nanoobjects are understood as meaning materials which are nanoscale in one, two or three external dimensions, preferably at least one dimension has a size of 1 to 100 nm, such as e.g. nanoplatelets, nanorods and nanoparticles. In the present invention, nanostructured particles are understood as meaning materials or particles which have an internal nanoscale structure. Typical representatives are e.g. aggregates and agglomerates of nanoobjects.

Particularly preferred particulate emulsifiers have an average primary particle size in at least one dimension of <1000 nm, preferably <500 nm and particularly preferably a range selected from the group consisting of 1 to 100 nm. The primary particle size can be determined in a known manner. The primary particle size is preferably determined by the visual evaluation of a transmission electron micrograph. Such particle sizes facilitate the formation of micro- or nano-emulsions.

The particulate emulsifiers can be used in the process according to the invention as such or in the form of dispersions or sols, in particular aqueous dispersions or sols.

Especially if particulate emulsifiers are used, it may be advantageous if, in step a) of the process according to the invention, the preparation of the emulsion is carried out with addition of one or more coemulsifiers. Coemulsifiers which can be used in the process according to the invention are in particular those compounds which interact with the solid-state emulsifier particles, preferably those which attach to, and thus hydrophobicize, the solid-state emulsifier particles. In the process according to the invention, coemulsifiers which can be used are in particular compounds selected from the group of cationic surfactants. Cationic coemulsifiers which may be used are in particular cationic ammonium compounds. Such compounds are available e.g. under the trade names VARISOFT® 470 P, VARISOFT® TC-90, VARISOFT® 110, AROSURF® TA-100, ADOGEN® 442-100 P, ADOGEN® 432, ADOGEN® 470, ADOGEN® 471, ADOGEN® 464, VARIQUAT® K 300, VARIQUAT® B 343, VARIQUAT® 80 ME, REWOQUAT® 3690, REWOQUAT® WE 15, REWOQUAT® WE18, REWOQUAT® WE 28 or REWOQUAT® CR 3099 from Evonik Goldschmidt GmbH. In the process according to the invention, preference is given to using cetyltrimethylammonium bromide or VARISOFT® PATC as cationic coemulsifier.

As is known to the person skilled in the art, the crosslinking or curing of alkoxysilyl groups takes place in a two-stage chemical process in which, in a first step, in the presence of water, the silicon-bonded alkoxy groups are cleaved off as corresponding alcohols, and SiOH groups are formed. The latter then condense in the case of self-condensation to form Si—O—Si bridges with one another and form polymeric materials. Alternatively, the SiOH-functional intermediates react with substrates having reactive groups, e.g. particularly readily with OH-function-carrying silicatic surfaces, and lead to excellent chemical anchorage to the particular substrate. The curing rate can be influenced in a variety of ways by adding catalysts of varying the temperature. In contrast to a coating process, which is largely solvent-free, the particles here are deposited from a (dilute solution) emulsion in situ in a heterophase system.

Catalysts which can be used for the crosslinking or curing of the alkoxysilyl groups are the known polyurethanization, allophanatization or biuretization catalysts, which are known per se to the person skilled in the art, or the catalysts known in the literature and customarily used for the hydrolysis and condensation of alkoxysilanes. These include compounds such as, for example, the zinc salts zinc octoate, zinc acetylacetonate and zinc(II) ethylcaproate, or tetraalkylammonium compounds, such as N,N,N-trimethyl-$N^2$-hydroxypropyl-ammonium hydroxide, N,N,N-trimethyl-$N^2$-hydroxypropyl-ammonium 2-ethylhexanoate or choline 2-ethylhexanoate. Preference is given to using zinc octoate (zinc(II) ethylhexanoate) and the tetraalkylammonium compounds, particular preference is given to using zinc octoate. Furthermore, catalysts which can be used are the customarily used organic tin compounds, such as e.g. dibutyltin dilaurate, dioctyltin dilaurate, dibutyltin diacetylacetonate, dioctyltin diacetylacetonate, dibutyltin diacetate or dibutyltin dioctoate etc. Furthermore, it is also possible to use bismuth catalysts, e.g. the Borchi catalyst, titanium compounds, e.g. titanium (IV) isopropylate or titanyl acetylacetonate, iron(III) compounds, e.g. iron(III) acetylacetonate, aluminium compounds, such as aluminium triisopropylate, aluminium tri-sec-butylate and other alcoholates, and also aluminium acetylacetonate, calcium compounds, such as calcium disodium ethylenediaminetetraacetate or calcium diacetylacetonate, or else amines, e.g. triethylamine, tributylamine, 1,4-diazabicyclo[2.2.2]octane, 1,8-diazabicyclo[5.4.0]undec-7-ene, 1,5-diazabicyclo[4.3.0]-non-5-ene, N,N-bis(N,N-dimethyl-2-aminoethyl)methylamine, N,N-dimethylcyclohexylamine, N,N-dimethylphenylamine, N-ethylmorpholine etc. Organic or inorganic Brönsted acids such as acetic acid, lactic acid, trifluoroacetic acid, methanesulfonic acid, p-toluenesulfonic acid or benzoyl chloride, hydrochloric acid, phosphoric acid and mono- and/or diesters thereof, such as e.g. butyl phosphate, (iso)propyl phosphate, dibutyl phosphate etc., are also suitable as catalysts. It is of course also possible to use combinations of two or more catalysts.

Preference is given to metal salts, metal complexes and organometallic compounds. Particular preference is given to organometallic compounds containing tin, zinc, titanium and bismuth.

The catalyst is used in amounts of from 0.001 to 20.0% by weight, preferably 0.01 to 10.0% by weight and particularly preferably 1.0 to 5.0% by weight, based on the alkoxysilyl-functional compounds of the formula (1). The catalyst can be added in one portion or else in several portions or else continuously. Preference is given to adding the whole amount in one portion.

For the preparation of the particles and composite particles according to the invention, the silyl polyethers 1 can be used in a mixture with other reactive components, preferably with other compounds likewise having alkoxysilane groups. These alkoxysilanes may either be monomeric silanes like those of the formula (3) or else polymer-bonded silanes,

$$U_xSiV_{(4-x)} \qquad (3)$$

where U is identical or different groups that cannot be hydrolysed in the presence of water and catalytic amounts of Brönstedt acid at temperatures up to 100° C., V=identical or different groups that can be hydrolysed in the presence of water and catalytic amounts of Brönstedt acid at temperatures up to 100° C., or hydroxy groups, and x=1, 2, 3 or 4.

Within the context of this invention, hydrolysable means that at least 80% of the groups can be hydrolysed under the chosen conditions and can thus be cleaved off.

The alkyl chain can have 0 to 50, preferably 0 to 22, carbon atoms and may also be interrupted by heteroatoms such as oxygen or nitrogen or sulphur, or else may be a silicone radical. The aromatic radical may also be heteroaromatic. The radicals U and V may, if appropriate, have one or more customary substituents, such as, for example, halogen or alkoxy.

Nonhydrolysable radicals U according to the formula (3) with functional groups can be selected from the range of glycidyl or glycidyloxyalkylene radicals, such as, for example, β-glycidyloxyethyl, γ-glycidyloxypropyl, δ-glycidyloxypropyl, ε-glycidyloxypentyl, ω-glycidyl-oxyhexyl or 2-(3,4-epoxycyclohexyl)ethyl, the methacryloxyalkylene and acryloxyalkylene radicals, such as, for example, methacryloxymethyl, acryloxymethyl, methacryloxyethyl, acryloxyethyl, methacryloxypropyl, acryloxypropyl, methacryloxybutyl or acryloxybutyl, and the 3-isocyanatopropyl radical, and/or cyclic and/or linear (poly) urethane-group-containing and/or urea-containing and/or (poly)amino-group-containing radical.

The use of monomeric trimethoxysilyl- and triethoxysilyl-group-carrying compounds is particularly widespread; in the presence of moisture and suitable catalysts, these are in most cases able, even at room temperature, to condense with one another with the elimination of the alkoxy groups and formation of Si—O—Si bonds. Such organofunctional monomeric silanes are, for example, N-cyclohexylaminomethyltrimethoxysilane, N-cyclohexyl-3-aminopropyltriethoxysilane, 3-aminopropyltrimethoxy-silane, vinyltrimethoxysilane, vinyltriethoxysilane, vinyldimethoxymethylsilane, 3-isocyanatopropyltrimethoxy-silane, 3-glycidyloxypropyltrimethoxysilane, 3-glycidyl-oxypropyltriethoxysilane, 3-methacryloxypropyltrimethoxy-silane, methyltrimethoxysilane, methyltriethoxysilane, dimethyldimethoxysilane, phenyltriethoxysilane, octyl-trimethoxysilane, octyltriethoxysilane and hexadecyl-trimethoxysilane. The method is essentially known to the person skilled in the art.

For producing the particles and composite particles according to the invention, the compounds of the formula (1) can be used in a mixture with further liquid or solid additives. Besides organic solvents or liquid siloxanes, particulate additives can furthermore also be used. It may be advantageous if the surface of the additives used has at least one functional group, thus resulting in chemical reactions between compounds of the formula (1) with the functional groups on the particle surface. Examples of such additives are metals and metal alloys, metal oxides, mixed oxides, nitrides, carbides, hydroxides, carbonates or silicates. Further examples of such additives are organic particles, such as, for example, those based on cellulose, lignin, oxidized polyethylene or cured epoxide resin, siloxane resins, dyes and/or organic or inorganic pigments.

Figure 1:
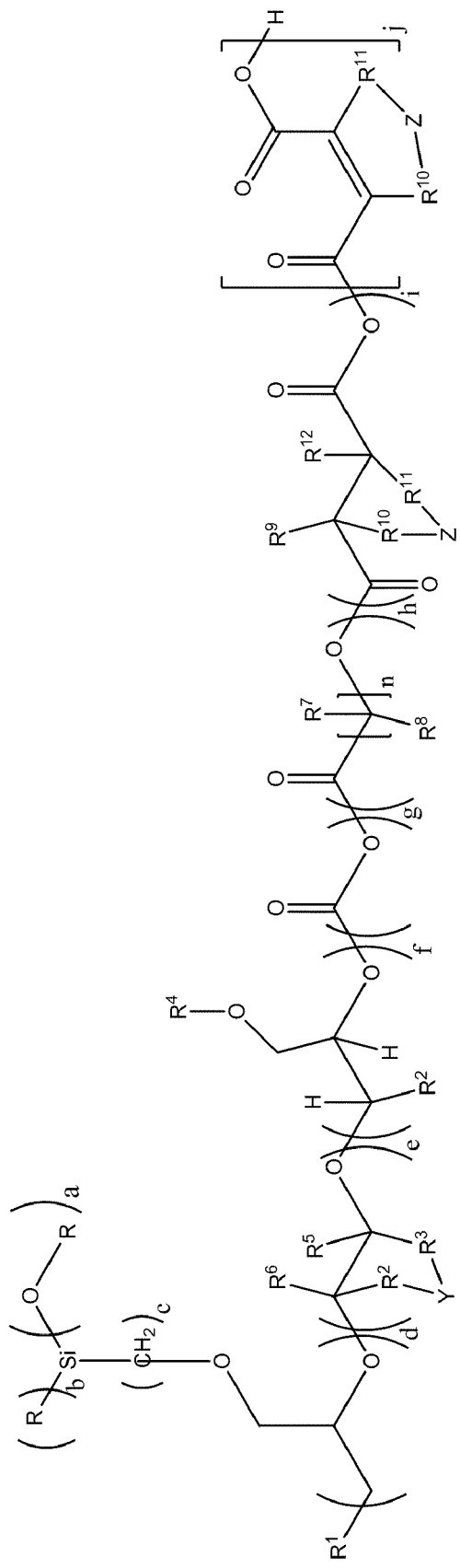
FIG. 1 depicts a silyl polyether 1 of the formula (1)

Further subjects of the invention are described by the claims, the disclosure of which forms part of this description in its entirety.

The production according to the invention of particles is described below by way of example, although the invention should in no way be considered as being limited to these exemplary embodiments.

Where ranges, general formulae or compound classes are stated below, then these are intended to encompass not only the corresponding ranges or groups of compounds that are explicitly mentioned, but also all part ranges and part groups of compounds which can be obtained by removing individual values (ranges) or compounds.

WORKING EXAMPLES

In the examples below, the following silyl polyethers 1 containing trialkoxysilyl groups were used, which have been prepared according to the as yet not laid open specification DE 10 2009 022630.3 by the process principle of DMC-catalysed alkoxylation of 3-glycidyloxypropyltriethoxysilane (Dynasylan® GLYEO) from Evonik Degussa GmbH. PO means propylene oxide.

GPC measurements to determine the polydispersity and mean molar masses were carried out under the following measurement conditions: column combination SDV 1000/10 000 Å (length 65 cm), temperature 30° C., THF as mobile phase, flow rate 1 ml/min, sample concentration 10 g/l, RI detector, evaluation against propylene glycol standard.

The viscosities were measured in accordance with DIN 53019 using a rotary viscometer from Brookfield (model LVT) at 25° C.

OH numbers were measured by the cold acetylation method in accordance with the analytical procedure C-V 17A (98) from the German Society for Fat Science (DGF).

The epoxide oxygen content of the silyl polyethers was determined in the presence of concentrated hydrochloric acid by the principle of back-titration with sodium hydroxide solution.

Trialkoxysilyl Polyether SP-1:

Low molecular weight, octanol-started, almost colourless, low-viscosity polyether with a block structure and of average molar mass ca. 3000 g/mol and seven-fold trialkoxysilane functionality.

Chemical Structure According to Monomer Dosage:
1-octanol+8 mol propylene oxide+3.5 mol GLYEO+8 mol propylene oxide+3.5 mol GLYEO+2 mol propylene oxide
Epoxide oxygen content <0.05%, OH number 19.5 mg KOH/g Trialkoxysilyl Polyether SP-2:

Low molecular weight, octanol-started, almost colourless, low-viscosity polyether of average molar mass ca. 4300 g/mol and twelve-fold trialkoxysilane functionality.

Chemical structure according to monomer dosage:
1-octanol+7 mol propylene oxide+12 mol GLYEO/10 mol propylene oxide
Epoxide oxygen content<0.05%, OH number 12.2 mg KOH/g Trialkoxysilyl Polyether SP-3:

Low molecular weight, octanol-started, almost colourless, low-viscosity polyether of average molar mass ca. 3000 g/mol and five-fold trialkoxysilane functionality.

Chemical Structure According to Monomer Dosage:
1-octanol+8 mol propylene oxide+5 mol GLYEO/19 mol propylene oxide
Epoxide oxygen content <0.05%, weight-average molecular weight Mw according to GPC analysis 3125 g/mol Trialkoxysilyl Polyether SP-4:

High molecular weight, polypropylene-glycol-started, almost colourless, medium-viscosity polyether of average molar mass ca. 10 000 g/mol and six-fold trialkoxysilane functionality.

Chemical structure according to monomer dosage:
Polypropylene glycol (2000 g/mol)+17 mol propylene oxide+6 mol GLYEO/92 mol propylene oxide
Epoxide oxygen content<0.05%, weight-average molecular weight Mw according to GPC analysis 10 280 g/mol Example 1

81.2 g of demineralized water were admixed with 7.5 g of LUDOX® SM-AS (Grace). The mixture was adjusted to a pH between 7 and 8 using dilute hydrochloric acid. 10 g of the trialkoxysilyl polyether SP-1 or SP-2 were added and preemulsified for 30 min in a vacuum dissolver at 5000 rpm.

0.43-1.30 g of a 5% strength by weight (with regard to the PATC) VARISOFT® PATC solution (Evonik Goldschmidt GmbH, quaternary ammonium compound) were added and the mixture was emulsified again for 30 min in a vacuum dissolver at 5000 rpm.

For the curing, 20 g of the emulsion were admixed with 0.4 g of a 10% strength by weight solution of dibutyltin diacetylacetonate in acetylacetone, vigorously shaken and left to stand for 18 h at room temperature. The particles were then filtered off and washed with water and ethanol. Drying at 60° C. in a drying cabinet produced a pourable powder.

Example 2

87.0 g of demineralized water were admixed with 2.5 g of LUDOX® SM-AS (Grace). The pH was adjusted as in example 1 using dilute hydrochloric acid. 10 g of the trialkoxysilyl polyether SP-1 or SP-3 were added and preemulsified for 30 min in a vacuum dissolver at 5000 rpm. 0.43 g of a 5% strength by weight (with regard to the PATC) VARISOFT® PATC solution (Evonik Goldschmidt GmbH) was added and the mixture was emulsified again for 30 min in a vacuum dissolver at 5000 rpm.

For the curing, 20 g of the emulsion were admixed with 0.4 g of a 10% strength by weight solution of dibutyltin diacetylacetonate in acetylacetone, vigorously shaken and left to stand for 18 h at room temperature. The particles were then filtered off and washed with water and ethanol. Drying at 60° C. in a drying cabinet produced a pourable powder.

Example 3

81.2 g of demineralized water were admixed with 7.5 g of LUDOX® SM-AS (Grace). The pH was adjusted as in example 1 using dilute hydrochloric acid. 10 g of the trialkoxysilyl polyether SP-4 were added and preemulsified for 30 min in a vacuum dissolver at 5000 rpm. 1.30 g of a 5% strength by weight (with regard to the PATC) VARISOFT® PATC solution (Evonik Goldschmidt GmbH) were added and the mixture was emulsified again for 30 min in a vacuum dissolver at 5000 rpm.

For the curing, 20 g of the emulsion were admixed with 0.4 g of a 10% strength by weight solution of dibutyltin diacetylacetonate in acetylacetone, vigorously shaken and heated at 80° C. for 1 h. The particles were then filtered off and washed with water and ethanol. Drying at 60° C. in a drying cabinet produced a pourable powder.

Example 4

87.0 g of saturated sodium sulphate solution were admixed with 2.5 g of LUDOX® SM-AS (Grace). The pH was adjusted as in example 1 using dilute hydrochloric acid. 10 g of the trialkoxysilyl polyether SP-1 were added and preemulsified for 30 min in a vacuum dissolver at 5000 rpm. 0.43 g of a 5% strength by weight (with regard to the PATC) VARISOFT®PATC solution (Evonik Goldschmidt GmbH) was added and the mixture was emulsified again for 30 min in a vacuum dissolver at 5000 rpm.

Figure 2:
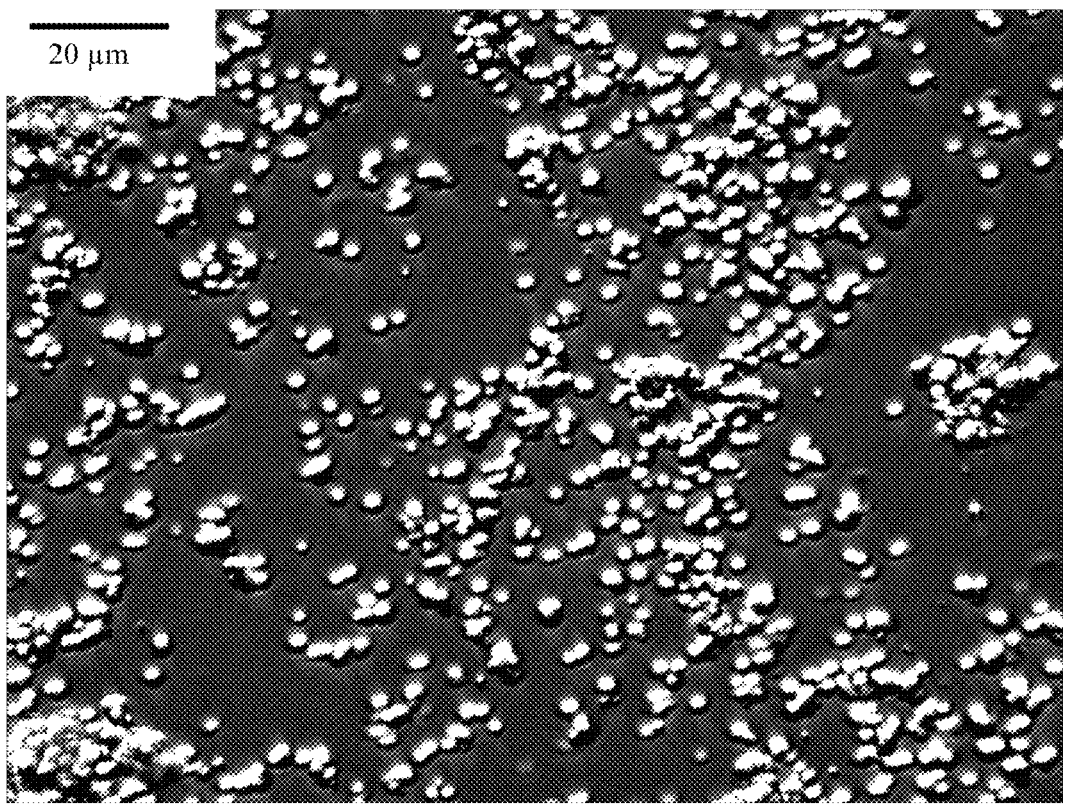
FIG. 2 depicts a micrograph of the cured dispersion.

For the curing, 20 g of the emulsion were admixed with 0.4 g of a 10% strength by weight solution of dibutyltin diacetylacetonate in acetylacetone, vigorously shaken and heated at 80° C. for 1 h. The particles were then filtered off and washed with water and ethanol. Drying at 60° C. in a drying cabinet produced a pourable powder. FIG. 2 shows a micrograph of the cured dispersion. The dispersion is polydisperse and exhibits a maximum primary particle size of 8 micrometers.

Example 5

15.0 g of Tagat® R200 (polyoxyethylene (200) glyceride ester, Evonik Goldschmidt GmbH), 10.0 g of TEGO® Alkanol S2 (octadecanol, polyoxyethylene (2) ether, Evonik Goldschmidt GmbH) and 75.0 g of water were heated to 60° C. in a stirred vessel and stirred at 1500 rpm using a Mizer disk until a homogeneous, viscous paste was formed. With the help of a dropping funnel, 300.0 g of the alkoxysilyl polyether SP-1 were incorporated into the paste dropwise over the course of 10 minutes. The finished paste was after-stirred for 10 minutes. The paste was then diluted, still at 60° C., with the remaining 400.0 g of water.

The emulsion was admixed with 6.0 g of dibutyltin diacetylacetonate. It was kept at 60° C. for 2 hours with stirring at 1000 rpm. The emulsion was then cooled. The particles were separated off by centrifuging for five hours at 7000 rpm (Sigma 4-15 laboratory bench centrifuge). Drying the sediment at 60° C. in a drying cabinet produced a pourable powder.

Example 6

Figure 3:
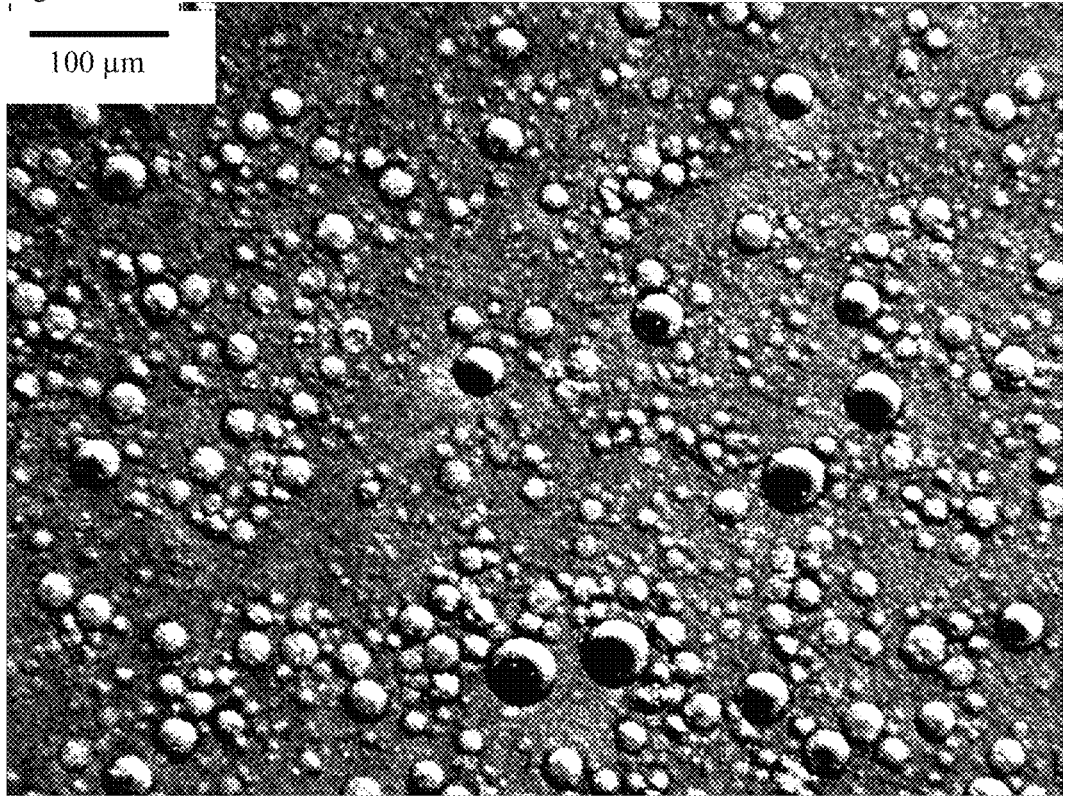
FIG. 3 depicts a micrograph of an emulsion.

15.0 g of Tagat® R200 (polyoxyethylene (200) glyceride ester, Evonik Goldschmidt GmbH), 10.0 g of TEGO® Alkanol S2 (octadecanol, polyoxyethylene (2) ether, Evonik Goldschmidt GmbH) and 75.0 g of water were heated to 60° C. in a stirred vessel and stirred using a Mizer disk at 1500 rpm until a homogenous, viscous paste was formed. With the help of a dropping funnel, a solution comprising 270.0 g of the alkoxysilyl polyether SP-1 and 30.0 g of octyltriethoxysilane were incorporated into the paste dropwise over the course of 10 minutes. The finished paste was after-stirred for 10 minutes. The paste was then diluted, still at 60° C., with the remaining 400.0 g of water. FIG. 3 shows a micrograph of the emulsion. The emulsion is polydisperse and has a maximum drop diameter of about 30 micrometers.

The emulsion was admixed with 6.0 grams of dibutyltin diacetylacetonate. It was kept at 60° C. for two hours with stirring at 1000 rpm. The emulsion was then cooled. The particles were separated off by centrifuging for five hours at 7000 rpm (Sigma 4-15 laboratory bench centrifuge). Drying of the sediment at 60° C. in a drying cabinet produced a pourable powder.

Examples 7-8

Composite Particles

Example 7

87.0 g of saturated sodium sulphate solution were admixed with 2.5 g of LUDOX® SM-AS (Grace). The pH was adjusted as in example 1 using dilute hydrochloric acid. 10.5 g of a mixture of trialkoxysilyl polyether SP-4 with 5% by weight of the VP AdNano® MagSilica (Evonik Degussa GmbH) were added and preemulsified for 30 min in a vacuum dissolver at 5000 rpm. 0.43 g of a 5% strength by weight (with regard to the PATC) VARISOFT® PATC solution (Evonik Goldschmidt GmbH) was added and the mixture was emulsified again for 30 min in a vacuum dissolver at 5000 rpm. For the curing, the emulsion was admixed with 2 g of a 10% strength by weight solution of dibutyltin diacetylacetonate in acetylacetone, vigorously shaken and heated at 80° C. for 2 h.

The particles were then filtered off and washed with water and ethanol. Drying at room temperature produced a pourable powder.

Example 8

87.0 g of saturated sodium sulphate solution were admixed with 7.5 g of LUDOX® SM-AS (Grace). The pH was adjusted as in example 1 using dilute hydrochloric acid. 10.5 g of a mixture of trialkoxysilyl polyether SP-1 with 1% by weight menthol or 5% by weight AEROSIL® R 805 (Evonik Degussa GmbH) were added and preemulsified for 30 min in a vacuum dissolver at 5000 rpm. 0.43 g of a 5% strength by weight (with regard to the PATC) VARISOFT® PATC solution (Evonik Goldschmidt GmbH) was added and the mixture was emulsified again for 30 min in a vacuum dissolver at 5000 rpm.

For the curing, the emulsion was admixed with 2 g of a 10% strength by weight solution of dibutyltin diacetylacetonate in acetylacetone, vigorously shaken and heated at 80° C. for 2 h. The particles were then filtered off and washed with water and ethanol. Drying at room temperature produced a pourable powder.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. Process for producing particles or composite particles by condensation of alkoxysilyl-group-carrying alkoxylation products with a molar mass greater than or equal to 300 g/mol,
characterized in that the alkoxysilyl-group-carrying alkoxylation products have at least one hydroxyl group; and
characterized in that the particles or composite particles are produced by condensation of an emulsified organic phase comprising at least one alkoxysilyl-group-carrying alkoxylation product, in an aqueous, optionally solids-stabilized phase and optionally in the presence of a catalyst.

2. Process according to claim 1, characterized by the process steps
a) producing an emulsion of water and an organic phase, where the organic phase comprises at least one alkoxysilyl-group-carrying alkoxylation product and optionally further additives,
where optionally the pH of the aqueous phase is adjusted to a value between 5 and 9 and then
b) condensing the silyl groups and curing the inner phase, optionally in the presence of a catalyst,
c) separating off the water.

3. Process according to claim 2, characterized in that one or more compounds of the formula (1)

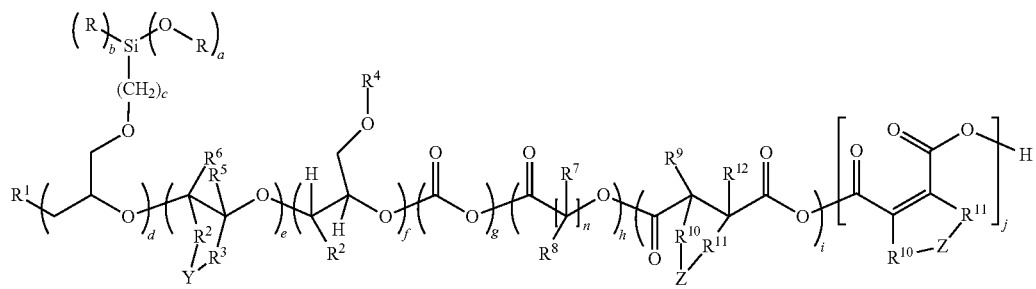

silyl polyether 1 where
a is an integer from 1 to 3,
b is an integer from 0 to 2, and the sum of a and b is 3,
c is an integer from 0 to 22,
d is an integer from 1 to 500,
e is an integer from 0 to 10 000,
f is an integer from 0 to 1000,
g is an integer from 0 to 1000,
h, i and j, independently of one another, are integers from 0 to 500,
n is an integer between 2 and 8
and with the proviso that the fragments with the indices d to j are freely permutatable among one another, i.e. can be exchanged for one another in the sequence within the polyether chain
and
R is one or more identical or different radicals selected from linear or branched, saturated, mono- or polyunsaturated alkyl radicals having 1 to 20 carbon atoms or haloalkyl groups having 1 to 20 carbon atoms;
$R^1$ is a hydroxyl group or a saturated or unsaturated linear, branched or cyclic or further substituted oxyorganic radical having 1 to 1500 carbon atoms, where the chain may also be interrupted by heteroatoms such as O, S, Si and/or N, or a radical containing an oxyaromatic system or $R^1$ is an unsaturated ether-functional group, or a mono- or polyfused oxyaromatic group or a linear or branched silicone-containing organic radical;
$R^2$ and $R^3$, and also $R^5$ and $R^6$ are identical or else, independently of one another, are H or a saturated or optionally mono- or polyunsaturated, also further substituted, mono- or polyvalent hydrocarbon radical, where, for the radicals $R^5$ and $R^6$, it is the case that they are a monovalent hydrocarbon radical and the hydrocarbon radical may be bridged cycloaliphatically via the fragment Y; Y may not be present, or else may be a methylene bridge with one or two methylene units, if Y is not present, then $R^2$ and $R^3$, independently of one another, are a linear or branched radical having 1 to 20 carbon atoms;
$R^2$-$R^3$ may be a —$CH_2CH_2CH_2CH_2$ group, Y is thus a —($CH_2CH_2$—) group and the hydrocarbon radicals R² and R³ may for their part be further substituted and carry functional groups such as halogens, hydroxyl groups or glycidyl-oxypropyl groups, R⁴ is a linear or branched alkyl radical of 1 to 24 carbon atoms, or an aromatic or cycloaliphatic radical which may optionally for its part carry alkyl groups;

R⁷ and R⁸, independently of one another, are either hydrogen, or alkyl, alkoxy, aryl or aralkyl groups, R⁹, R¹⁰, R¹¹ and R¹², independently of one another, are either hydrogen, or alkyl, alkenyl, alkoxy, aryl or aralkyl groups, where the hydrocarbon radical may be bridged cycloaliphatically or aromatically via the fragment Z, where Z may be either a divalent alkylene radical or else alkenylene radical, is used as alkoxysilyl-group-carrying alkoxylation products.

4. Process according to claim 3, characterized in that, process step (b), a catalyst is added via the water phase.

5. Process according to claim 3, characterized in that the compound of the formula (1) has more than one alkoxysilyl group per hydroxyl group.

6. Process according to claim 1, characterized in that the emulsion optionally comprises dissolved salts, solid or liquid emulsion stabilizers, particulate emulsifiers and/or coemulsifiers.

7. Process according to claim 1, characterized in that the emulsion comprises further liquid or solid additives selected from the group comprising organic solvents, liquid siloxanes, particulate additives, metals, metal alloys, metal oxides, mixed oxides, nitrides, carbides, hydroxides, carbonates or silicates, organic particles based on: cellulose, lignin, oxidized polyethylene or cured epoxy resin, siloxane resins, and/or dyes and/or organic or inorganic pigments.

8. Process according to claim 4, characterized in that the alkoxysilyl-group-carrying alkoxylation products are used in a mixture with further monomers or polymer-bonded alkoxysilane compounds.

9. Process according to claim 8, characterized in that, in the mixture, monomeric alkoxysilanes and/or polymer-bonded silanes of the formula (3) are used, $$U_xSiV_{(4-x)} \tag{3}$$

where U is identical or different groups that cannot be hydrolyzed in the presence of water and catalytic amounts of Brönstedt acid at temperatures up to 100° C., V=identical or different groups that can be hydrolyzed in the presence of water and catalytic amounts of Brönstedt acid at temperatures up to 100° C., or hydroxyl groups, and x=1, 2, or 3.

10. Particles and/or composite particles produced by one of the processes according to claims 1 to 9.

* * * * *